No. 642,797. Patented Feb. 6, 1900.
J. O. LAWSON.
PIPE WRENCH.
(Application filed Apr. 21, 1899. Renewed Jan. 8, 1900.)
(No Model.)

WITNESSES
A. M. Tuttle
M. S. Morse

INVENTOR.
John O. Lawson
By his Att'ys
C. N. B. Tuttle

THE NORRIS PETERS CO., PHOTO-LITHO., WASHINGTON, D. C.

UNITED STATES PATENT OFFICE.

JOHN O. LAWSON, OF BROCKTON, MASSACHUSETTS.

PIPE-WRENCH.

SPECIFICATION forming part of Letters Patent No. 642,797, dated February 6, 1900.

Application filed April 21, 1899. Renewed January 8, 1900. Serial No. 781. (No model.)

*To all whom it may concern:*

Be it known that I, JOHN O. LAWSON, a citizen of the United States of America, residing at Brockton, in the county of Plymouth, Commonwealth of Massachusetts, have invented certain Improvements in Pipe-Wrenches, of which the following, read in connection with the accompanying drawings, is a specification.

Figure 1:
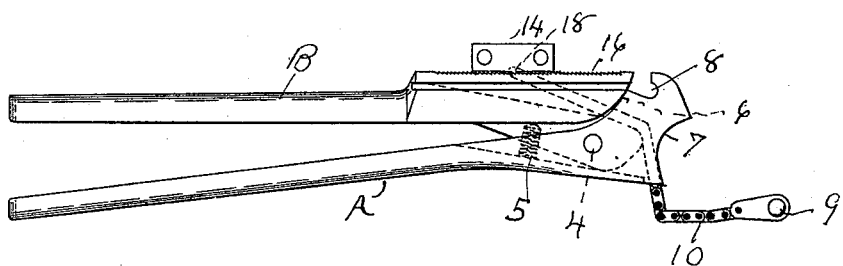
Figure 3:
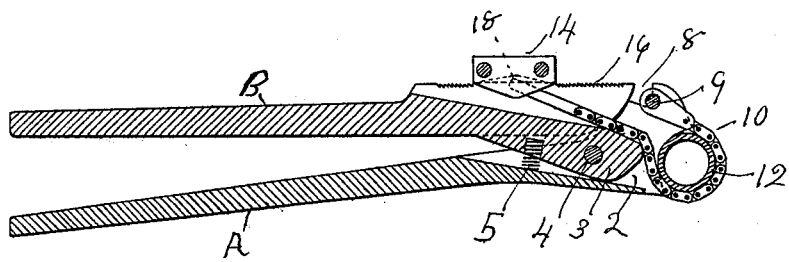
Figure 2:
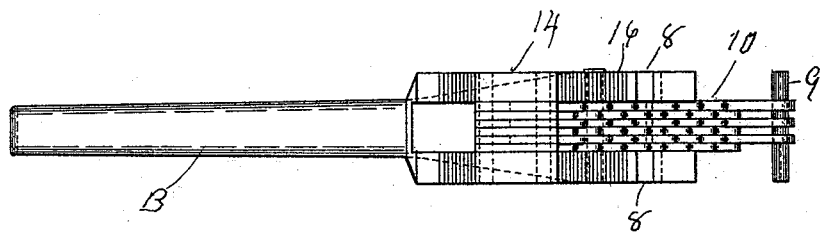

In the accompanying sheet of drawings, Figure 1 is a side elevation. Fig. 2 is a plan, and Fig. 3 is an elevation of a section on line 3 of Fig. 2.

In the member A is formed a recess 2, adapted for receiving the tongue projection 3 of member B. Said members A and B are pivotally connected by pin 4. Spring 5 operates for spreading the handle ends of said members, the amount of such spreading movement being limited by the members coming together at point 6. (See Fig. 1.) The end faces 7 of member A are designed for bearing on the intended pipe. (See Fig. 1.) In the member A are formed the notches or recesses 8, wherein may be seated the pin 9 for holding one end of the chain 10. Said chain 10, being located in the recess 2 of member A, which, to that end, is also continued in member B, (see Fig. 3,) passes around the pipe 12 and connects with slide 14. The slide 14 has ratchet-toothed formation 18, adapted for cooperation with similar formations 16 on the member B, whereby the slide is adapted for sliding on member B in order to take up, and consequently to tighten, the chain about the pipe. Said toothed formations hold the grip whenever secured.

In operating the device pin 9 is lifted from the notches 8 to free one end of the chain, as shown in Fig. 1. The device is then applied to the pipe, and the free end of the chain, being carried around the pipe, is secured by replacing the pin 9 in the notches 8, after which the slide 14 is moved to draw and tighten the chain approximately to the pipe. The handle ends of the members A B are then pressed together, whereby the end of tongue projection 3 is carried forcibly against the chain 10, and this actuates the chain for gripping the pipe. By allowing the handle ends to separate the grip of the chain is relaxed, whereupon the backward movement may be made for placing the device in position for taking the next grip. The chain is made sufficiently flat and smoothed to prevent cutting or unduly marking the surface of the pipe.

I claim—

1. A device of the character indicated, comprising, in combination, the handle member A, provided with bearing-faces 7, recess 2, and pin-receiving notches 8, the handle member B, provided with tongue 3 and ratchet-toothed formation 16, the pin 4 pivotally connecting the said members and the chain 10 having on one end a pin for entering the notches 8, and on the other end a slide adapted for engaging the said ratchet-toothed formations 16, all substantially as described.

2. A device of the character indicated, comprising, in combination, the handle member A provided with the recess 2 and bearing-faces 7, the handle member B provided with tongue projection 3, the pin 4 pivotally connecting said members and the chain 10 having one end detachably connected with member A and the other end adjustably connected with member B, all substantially as described.

Signed by me at Brockton, Massachusetts, this 8th day of April, 1899.

JOHN O. LAWSON.

Witnesses:
HENRY F. PARKER,
CARL G. SMITH.